United States Patent [19]

Humble et al.

[11] Patent Number: 4,966,336
[45] Date of Patent: Oct. 30, 1990

[54] FISHING REEL ASSEMBLY

[75] Inventors: Raymond Humble; Main Hudson; Charles Norris, all of Alnwick, Great Britain

[73] Assignee: House of Hardy Limited, Northhumberland, United Kingdom

[21] Appl. No.: 337,569

[22] Filed: Apr. 13, 1989

[30] Foreign Application Priority Data

Mar. 2, 1989 [GB] United Kingdom ............... 8904753

[51] Int. Cl.⁵ .......................................... A01K 89/033
[52] U.S. Cl. .................................. 242/295; 188/82.2; 188/83; 242/282; 242/303; 242/317
[58] Field of Search ............... 242/282, 295, 303, 317; 188/82.2, 83

[56] References Cited

U.S. PATENT DOCUMENTS

| | | | |
|---|---|---|---|
| 2,270,283 | 1/1942 | Ewald | 188/82.2 X |
| 3,939,729 | 2/1976 | Brockelsky | 188/82.2 X |
| 3,989,204 | 11/1976 | Lemery | 242/295 |
| 4,515,325 | 5/1985 | Ito | 242/295 |
| 4,750,687 | 6/1988 | Sievert | 242/295 |
| 4,832,278 | 5/1989 | Sugeta | 188/82.2 X |

FOREIGN PATENT DOCUMENTS 2096441 10/1982 United Kingdom ............... 242/295

Primary Examiner—Katherine Matecki

[57] ABSTRACT

A fly fishing reel assembly has a line spool 4 mounted for rotation on a spindle 6 in a cage 2. Provided on the cage is a drag mechanism 11 having a rotor 12 co-axial with the spool and rotatable relative to the carrier. The resistance to rotation of the rotor 12 is variable by rotation of a wheel 15. Rotatable with the spool 8 are pivoted latch levers 20 which are engageable with a circumferential array of teeth 13 on the rotor. An adjustable slide ring 22 on the spool optionally pivotally adjusts the latch levers 20 from the first position in which relative rotation between the spool and cage in one sense of direction couples the spool through the latch levers 20 to rotate in unison with the rotor 13 (and therefore rotational resistance to be applied) whereas during said relative rotation in the opposite sense of direction the latch levers 20 trip over the teeth 13 for the spool to rotate freely. In said second position and during said relative rotation in the one sense of direction between the spool and cage, the latch levers trip over the teeth 13 for the spool to rotate relatively freely while during said relative rotation in the opposite sense of direction the spool is coupled through the latch levers to rotate in unison with the rotor and thereby resistance is applied by the drag mechanism to rotation of the spool. By adjustment of the slide ring 22 the reel assembly can readily be adapted for left or right hand use.

15 Claims, 2 Drawing Sheets

FISHING REEL ASSEMBLY

TECHNICAL FIELD & BACKGROUND ART

The present invention relates to a fishing reel assembly of the kind comprising a line spool mounted for rotation about its axis relative to a spool carrier. With such assemblies it is known to provide a drag mechanism (which may also be referred to in the art as a brake or clutch mechanism) between the spool and its carrier which acts so that in one direction of rotation the spool rotates relatively freely with respect to the carrier while in the opposite direction of rotation a resistance is imparted to the spools rotation. Typically the drag mechanism comprises a spring loaded ratchet on the spool which engages with a toothed wheel mounted to rotate, with resistance, on the carrier so that in the one sense of direction for rotation of the spool, the ratchet trips without effect over the toothed wheel (usually so that the fishing line can be wound freely onto the spool) and when the spool is rotated in the opposite sense of direction the ratchet is urged into engagement with the toothed wheel so that the spool and wheel rotate in unison and thereby a resistance is imparted by the drag mechanism to the rotation of the spool (such drag or resistance being applied when the fishing line is being pulled from and to rotate the spool).

Generally, the drag means is manually adjustable to vary the amount of resistance which is applied to the spools rotation and as may be considered appropriate to the weight of line on the spool.

It is conventional practice for fishing reel assemblies with drag mechanisms to be manufactured either for left handed or right handed use. It will be appreciated that with the reel fitted in conventional manner beneath a rod as in fly fishing it will be intended that the drag mechanism will be engaged to resist rotation of the spool as the line is pulled from the spool through the rod rings. The majority of fishing reels are manufactured for left hand winding of the spool while the rod is held in the right hand (i.e. right hand use). It has hitherto been proposed to provide means whereby a right hand use reel can be converted to left hand use but this has necessitated in the reel assembly being extensively dis-assembled and a complex re-structuring of the drag mechanism—such re-structuring generally requiring workshop facilities. It is an object of the present invention to provide a fishing reel assembly of the kind previously discussed in which a drag or resistance is provided for relative rotation between the line spool and the spool carrier in one sense of direction of the spool while the spool can rotate freely in the opposite sense of direction and which assembly can be converted for either left handed or right handed use in a manner which alleviates the disadvantages of the prior proposals.

STATEMENT OF INVENTION & ADVANTAGES

According to the present invention there is provided a fishing reel assembly comprising a line spool member mounted for rotation about its axis relative to a spool carrier; drag means on the carrier, and coupling means for drivingly engaging or disengaging the drag means with the spool member whereby with the coupling means drivingly engaged, relative rotation between the spool member and the carrier is resisted by the drag means and with the coupling means disengaged the spool member can rotate relatively freely with respect to the carrier, and wherein means is provided for optionally adjusting said coupling means from a first condition to a second condition, in said first condition and during relative rotation between the spool member and carrier in one sense of direction, the spool member rotates relatively freely with respect to the carrier and during said relative rotation in the opposite sense of direction the coupling means engages the spool member with the drag means for resistance or drag to be imparted to the rotation of the spool member and in said second condition and during relative rotation between the spool member and carrier in said one sense of direction the coupling means engages the spool member with the drag means for resistance or drag to be imparted to the rotation of the spool member and during said relative rotation in said opposite sense of direction the spool member rotates relatively freely with respect to the carrier.

By the present invention it is envisaged that the reel assembly can be converted from left handed to right handed use and vice versa merely by adjusting the coupling means from its first condition to its second condition, such adjustment being effected quickly and simply. For example the required adjustment may be achieved merely by displacing an easily accessible lever or similar component in the assembly and without extensive dismantling of the assembly. The adjustable component may be carried by either the spool member or the carrier, depending upon the particular structure of the drag means and the coupling means. It is conventional for the line spool member of a fishing reel to be readily removable either for servicing or, more usually, so that a replacement line spool member having a different weight fishing line can be fitted to the assembly and the adjustment of the coupling means from one handed use to the opposite hand may require the line spool to be removed from the assembly to permit access to the adjustable component—such removal of the spool member is not regarded as an inconvenience (particularly bearing in mind that fishing reel assemblies tend to be personal so that once an adjustment has been made for either left handed or right handed use it is unlikely that a further conversion will be required).

Preferably the drag means mounted on the carrier has a rotor member which is coaxial with the spool and is rotatable, under resistance, with respect to the carrier. The drag means is preferably adjustable to vary the resistance or drag to rotation of the rotor member relative to the carrier. With such a structure the coupling means may comprise an adjustable component by which the coupling is optionally adjusted from a position in which during relative rotation between the spool member and carrier in one sense of direction the spool member drivingly engages to rotate in unison with the rotor member and thereby resistance or drag is imparted to said rotation of the spool member and during relative rotation between the spool member and carrier in the opposite sense of direction the spool member is drivingly dis-engaged from the rotor member to rotate freely relative thereto (and to the carrier) to a further position in which during relative rotation between the spool member and carrier in said one sense of direction the spool member is drivingly dis-engaged from the rotor member to rotate freely relative thereto (and to the carrier) and during relative rotation between the spool member and carrier in the opposite sense of direction the spool member drivingly engages to rotate in unison with the rotor member and thereby resistance or drag is imparted to said rotation of the spool member.

In a preferred construction the coupling means provided between the rotor member and spool member as aforementioned comprises a catch rotatable with one of said members, a circumferential array of teeth rotatable with the other of said members, and biasing means which biases the catch in a sense to engage said teeth. The adjustable component optionally adjusts the catch on the member which carries it from a first position to a second position whereby, with the adjustable component in said first position and during relative rotation between the spool member and carrier in one sense of direction the catch is displaced by said teeth and against its biasing out of engagement with the teeth for the spool member to rotate freely relative to the rotor member and during said relative rotation in the opposite sense of direction the catch is displaced under its biasing to engage said teeth for the spool member and rotor member to rotate in unison and thereby resistance or drag to be imparted to the rotation of the spool member, and with said adjustable component in said second position and during relative rotation between the spool member and carrier in said one sense of direction the catch is displaced under its biasing to engage said teeth for the spool member and rotor member to rotate in unison and thereby resistance or drag to be imparted to the rotation of the spool member and during said relative rotation in said opposite sense of direction the catch is displaced by said teeth and against its biasing out of engagement with the teeth for the spool member to rotate freely relative to the rotor member.

Preferably the rotor member of the drag means comprises a wheel having the circumferential array of teeth while the catch of the coupling means together with the adjustable component for displacing the catch to either its first or second position is carried by the spool member. It will be appreciated however that a converse structure is possible whereby the catch and adjustable component therefor are carried by the rotor of the drag means while the circumferential array of teeth are carried by the spool member. In a typical fishing reel assembly as used in fly fishing the spool member is rotatably mounted on a spindle which projects concentrically within a cage that forms the carrier and which cage is intended to be secured to a fishing rod. Conventionally the spool member will readily be removable from the cage. Conveniently the rotor member, catch, adjustable component and circumferential array of teeth are located between a back plate of the cage and an opposing side of the spool so that the adjustable component is accessible for adapting the assembly for left handed or right handed use upon removal of the spool from the cage. By locating the adjustable component and its associated mechanism between the back plate of the cage and the spool as aforementioned the mechanism can be effectively protected against tampering and the ingress of foreign bodies.

The catch which is engagable with the circumferential array of teeth is preferably in the form of a spring loaded lever or latch which is pivotally mounted to rock to either of two positions which correspond to the aforementioned first and second positions and the pivotal displacement of the latch lever to a selected one of its positions is controlled by the adjustable component. For this purpose the adjustable component is conveniently a rocking or sliding member which is displaceable to adjust the spring biasing of the rocking latch lever to urge that rocking lever into its selected first or second position. In a preferred structure the adjustable component is a sliding member which carries a leaf or other spring that bears on the rocking latch lever so that during its sliding displacement the spring moves over the latch lever to pivot it from its first position to its second position as required. Conveniently the sliding member is annular and concentric with the circumferential array of teeth and is rotationally adjustable relative to the spool member or rotor member which carrier it and between predetermined limits to adjust the pivotted latch lever to its first position or second position as selected for engagement with the teeth—the predetermined limits of movement of the sliding member corresponding to the first and second positions of the rocking latch lever. Although a single catch can be provided for engagement with the teeth when drag or resistance is imparted to rotation of the spool member, it is preferred that two or more such catches are provided which are mounted to engage with the teeth at circumferentially spaced locations. The several catches may be controlled by a common adjustable component (such as the slide member as previously discussed) so that during adjustment of that component they are simultaneously adapted for either left handed or right handed use of the reel assembly as selected.

The drag means may be of conventional form whereby the resistance to relative rotation is provided by the frictional engagement of relatively rotatable surfaces. Generally the frictional engagement is adjustable by moving these surfaces into and out of engagement to vary the resistance to rotation from negligible resistance where the spool member may rotate relatively freely with respect to the carrier even though the spool is engaged with the drag means, to a maximum resistance where the spool member may effectively be braked or locked solid with the carrier.

DRAWINGS

One embodiment of a fishing reel assembly constructed in accordance with the present invention will now be described, by way of example only, with reference to the accompanying illustrative drawings, in which:

FIG. 1 diagrammatically illustrates an axial section through the assembly;

DETAILED DESCRIPTION OF DRAWINGS

Figure 1:
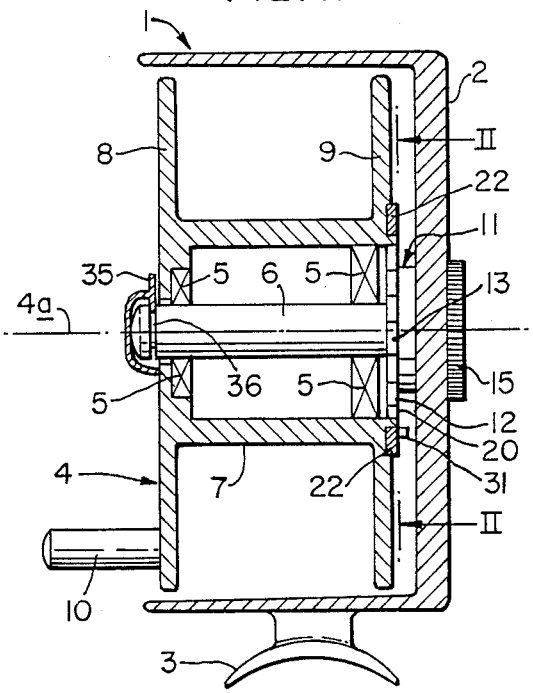

The assembly shown in FIG. 1 is basically similar to conventional fly fishing reels comprising a cage 1 having a back plate 2 and a bracket 3 by which the assembly is intended to be fitted to a rod. Located within the cage 1 is a line spool 4 which is mounted to be rotatable about an axis 4a by roller bearings 5 on a cylindrical spindle 6 which is concentric with the axis 4a and projects from the back plate 2. The spool 4 comprises a hollow drum 7 within which the bearings 5 are received and on which fishing line is wound, a circular front plate 8 and an annular rear plate 9. The plates 8 and 9 provide flanges for the drum 7 between which the line is retained. A winding handle 10 projects from the front plate 8.

Mounted on the back plate 2 of the carrier is a drag mechanism 11 which includes a rotor in the form of a wheel 12 concentric with and rotatable relative to the shaft 6. The wheel 12 is castellated at its outer peripheral edge to provide a circumferentially spaced array of teeth 13. Relative rotation between the toothed wheel 12 and the spindle 6 (and thereby between the wheel 12 and back plate 2) is permitted through relative rotation between slidably engaging friction discs indicated at 14 in FIG. 4. The discs 14 form part of the drag mechanism 11 and are conventional for drag, clutch or brake devices in fishing reel assemblies whereby as they are urged into engagement there is an increase in the resistance to relative rotation between the toothed wheel 12 and the back plate 2 and as the pressure between the frictionally engaging surfaces of the discs is permitted to decrease the toothed wheel becomes progressively freer to rotate on the spindle 6. In the present embodiment the discs 14 are moved progressively axially into and out of frictional engagement with each other by rotation of a knurled knob 15 on the back plate 2 which knob 15 thereby controls the resistance to rotation of the toothed wheel 12. In practice the knob 15 can vary the aforementioned resistance to rotation of the wheel 12 progressively between a condition in which the toothed wheel can rotate relatively freely with respect to the cage 1 to a condition in which the toothed wheel is effectively secured against rotation with respect to the cage.

Figure 4:
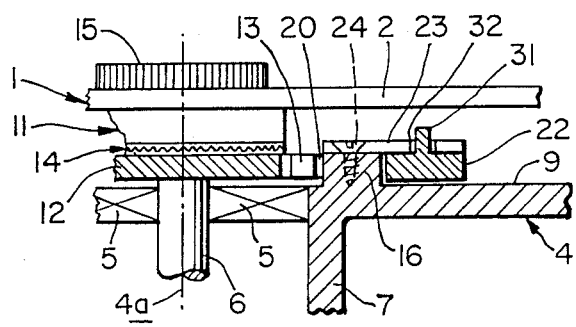
FIG. 4 is a scrap section taken on the line IV—IV of FIG. 3.
Figure 2:
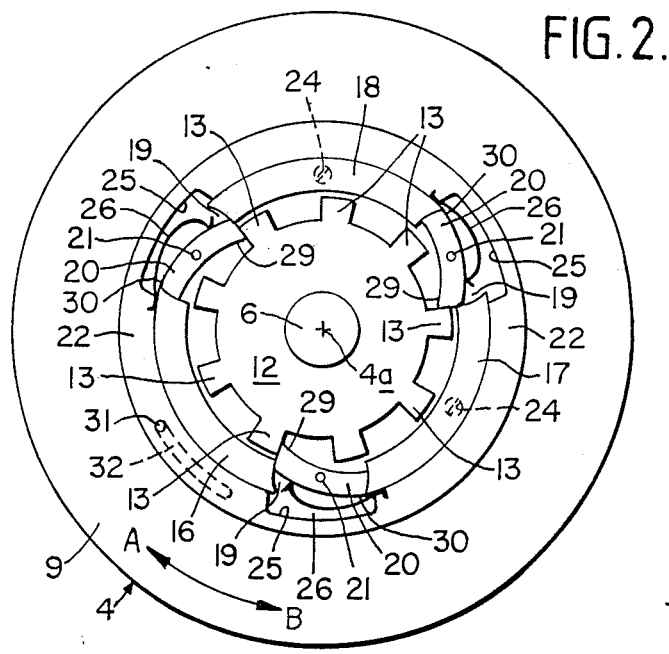
FIG. 2 illustrates an end view of the spool in the assembly along the line II—II of FIG. 1 and shows catches of the assembly in a first position.
Figure 3:
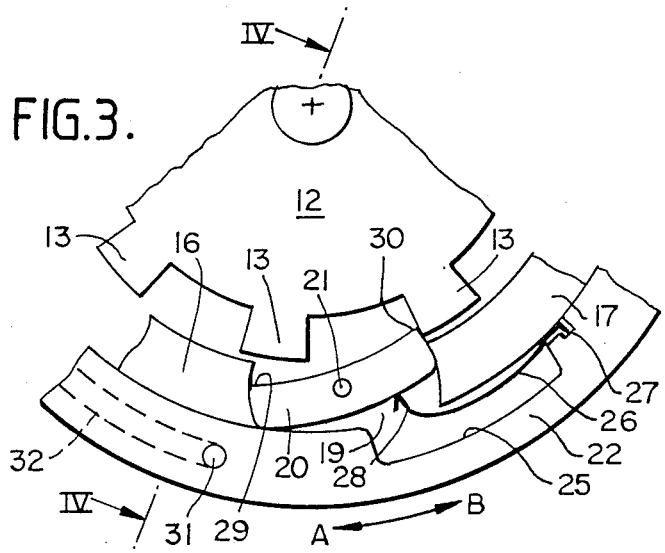
FIG. 3 shows a part of the assembly similar to that shown in FIG. 2 but with the catches in a second position.

Located on the face of the spool rear plate 9 which axially opposes the carrier back plate 2 is a circumferentially spaced array of three part annular ribs 16, 17 and 18 which form part of a common annulus concentric with the axis 4a. The ribs 16 to 18 are conveniently formed integral with the back plate 9 as shown in FIG. 4. The spacings provided between the respectively adjacent ends of the three ribs form three circumferentially spaced lever housings 19 within each of which is located a latch lever 20. Each lever 20 is mounted by a pin 21 on the rear plate 9 to be capable of pivoting over that plate and in a plane parallel therewith within its respective housing 19. When the spool 4 is fitted to the spindle 6 the toothed wheel 12 is received concentrically within the annulus formed by the ribs 16, 17 and 18 so that the three latch levers 20 lie in the same radial plane as the toothed wheel and are capable of pivoting about their respective pins 21 for one or other ends 29, 30 of each of those levers to be engagable between the teeth 13 of the wheel as shown in FIGS. 2 and 3.

Closely received on the outer circumferential edge of the annulus presented by the part annular ribs 16, 17 and 18 is an adjustable component in the form of an annular slide ring 22. The slide ring 22 is concentric with the axis 4a and in the same radial plane as the toothed wheel member 12 (see FIG. 4). The slide ring 22 is rotationally displaceable in sliding engagement with and relative to the part annular ribs (and rear plate 9) and is retained on the rear plate by an annular cover plate 23 (see FIG. 4)—for convenience the cover plate has been omitted from FIG. 2. The cover plate 23 is retained on the rear plate 9 by screws 24 which extend into the part annular ribs. Conveniently, the cover plate 24 also serves to retain the latch levers 20 on their respective pins 21 in the housings 19.

The slide ring 22 has three circumferentially spaced recesses 25 formed in its inner peripheral surface. The recesses 25 are spaced to correspond with the circumferential spacing of the latch levers 20 and within each recess 25 is accommodated a leaf spring 26. The three leaf springs are similarly formed and orientated with respect to the slide ring and are associated one each with the latch levers 20. One end 27 of each spring 26 is anchored to the slide ring for rotational displacement therewith while the other end 28 of each spring abuts the latch lever 20 with which that spring is associated. The leaf springs 26 provide a radially inward biasing force on the latch levers 20 which they respectively abut so that during relative rotation between the slide ring 22 and the ribs 16, 17 and 18, the springs can slide substantially over the length of the latch levers 20 to displace those levers simultaneously and is a similar sense with a rocking motion about the pivot pins 21 from a first position shown in FIG. 2 (where the ends 29 of the levers project radially inwardly of the ribs 16 to 18) to a second position shown in FIG. 3 (where the other ends 30 of the latch levers project radially inwardly of the part annular ribs). The aforementioned rotation of the slide ring 22 is facilitated by a manually engageable stud 31 which projects from the slide ring and extends through a part annular slot 32 in the cover plate 23. The extent of the slot 32 determines the relative rotation which is permitted between the slide ring 22 and the back plate 9 that is consistent with the springs 26 being displaced to rock the latch levers 20 from their first position (corresponding to the stud 31 being at one end of the slot 32) to their second position (corresponding to the stud 31 being at the opposite end of the slot 32).

When the latch levers 20 are in their first or second position the ends 29 or 30 of those levers which project inwardly of the ribs 16, 17 and 18 will extend into a space formed between adjacent teeth 13 of the toothed wheel 12. Upon relative rotation between the toothed wheel and the levers 20 in one sense the teeth 13 of the wheel abut the ends (either 29 or 30 as the case may be) of the respective levers for rotational drive to be transmitted between the toothed wheel and spool and upon relative rotation between the toothed wheel and the levers 20 in the opposite sense the teeth 13 will slide along the respective latch levers 20 so that those levers are displaced radially outwardly against the biasing of the respective springs 26 to move out of the path of the teeth (so that the latch levers trip over the teeth) and rotational drive is not transmitted between the toothed wheel and the spool so that the spool can rotate freely relative to the toothed wheel.

With the latch levers 20 in their first position as shown in FIG. 2 it will be seen that if the spool 4 is rotated about the spindle 6 in the direction of arrow A the ends 29 of the latch levers engage with respective teeth 13 on the wheel 12 so that the spool and toothed wheel will rotate in unison. Consequently there will be a resistance to rotation of the spool in the direction of arrow A dependent upon the drag or braking effect on the wheel 12 as determined by the drag mechanism 11. Alternatively if the spool is rotated in the direction of arrow B in FIG. 2 it will be seen that the latch levers 20 trip without effect over the teeth 13 so that the spool 4 rotates freely about the shaft 6. Accordingly the first position of the levers shown in FIG. 2 would correspond with the spool being rotated in the direction of arrow B to wind in line and being rotated against the drag mechanism in the direction of arrow A, possibly by playing a fish.

Referring now to FIG. 3, where the slide ring 22 has been rotated to adjust the latch levers 20 to their second position, it will be seen that if the spool is now rotated in the direction of arrow A (similarly to FIG. 2) the latch levers 20 trip without effect over the teeth 13 and the spool rotates freely relative to the cage. Alternatively if the spool is rotated in the direction of arrow B in FIG. 3 the ends 30 of the levers 20 abut against respective teeth 13 of the wheel 12 so that the toothed wheel and spool rotate in unison to impart a required drag to the spool rotation. The characteristics for the directions of rotation of the spool are therefore reversed from position 1 to position 2 and this reversal is appropriate for adapting the spool for left handed or right handed use simply by sliding the stud 31 to the appropriate end of the slot 32.

In FIG. 1 the spool 4 is retained on the spindle 6 in conventional manner by a spring clip 35 on the spool engaging in an annular recess 36 in the free end of the spindle. The spool can therefore be easily removed from the reel assembly simply by releasing the spring clip 35 and withdrawing the spool from the cage 1. With the spool removed from the cage the stud 31 is readily accessible to displace the slide ring should it be required to convert the assembly from one handed use to the other.

In an alternative embodiment (not shown) the structure of the transmission between the drag mechanism 11 and the spool 4 is effectively reversed whereby the spool rear plate 9 is provided with a circumferentially spaced array of teeth concentric with the axis 4a and which teeth are rotatable with the spool for example, being integrally formed therewith) while the rotor of the drag mechanism 11 is provided with spring loaded latch levers and a control slide ring for determining the pivotal first or second position for those latch levers (in a similar manner to the first embodiment) and which spring loaded latch levers and control slide ring are rotatable with the rotor of the drag mechanism for the latch levers to engage with or trip over the teeth on the spool as appropriate. Such a structure is advantageous in so far as the circumferential array of teeth may simply and inexpensively be provided on the rear plate 9 for each of several spools which can be used with the reel assembly while the relatively complex structure for the spring loaded latch levers and their control ring is incorporated in the cage and therefore available for each spool fitted thereto. The aforementioned teeth on the spool 4 would, conveniently, be machined in an annular rib such as that shown at 16, 17 and 18 on the rear plate of the spool.

Although in the above described structures the circumferential array of rack teeth are of an external formation with the latch levers located radially outwardly of that formation, it will be appreciated that the structure can readily be modified, for example, to provide a circumferential array of rack teeth having an internal formation with the latch levers located radially inwardly of those teeth.

What is claimed is:

1. A fishing reel assembly comprising a line spool member mounted on a spool carrier for rotation about its axis relative to said spool carrier; drag means on the carrier, and coupling means for drivingly engaging or disengaging the drag means with the spool member whereby with the coupling means drivingly engaged, relative rotation between the spool member and the carrier is resisted by the drag means and with the coupling means disengaged the spool member can rotate relatively freely with respect to the carrier, and wherein means is provided for optionally adjusting said coupling means from a first condition to a second condition, in said first condition and during relative rotation between the spool member and carrier in one sense of direction the spool member rotates relatively freely with respect to the carrier and during said relative rotation in an opposite sense of direction the coupling means engages the spool member with the drag means for resistance to be imparted to the rotation of the spool member, and in said second condition and during relative rotation between the spool member and carrier in said one sense of direction the coupling means engages the spool member with the drag means for resistance to be imparted to the rotation of the spool member and during said relative rotation in said opposite sense of direction the spool member rotates relatively freely with respect to the carrier, said drag means having a rotor member which is rotatable, under resistance, with respect to the carrier and co-axially with respect to the spool member, and said coupling means comprising an adjustable component which is optionally adjustable from a first position corresponding to said first condition in which during relative rotation between the spool member and carrier in said one sense the spool member rotates relatively freely with respect to the rotor member and during said relative rotation in the opposite sense the spool member is drivingly engaged with the rotor member to impart resistance to said rotation of the spool member, to a second position corresponding to said second condition in which during relative rotation between the spool member and carrier in said one sense the spool member is drivingly engaged with the rotor member to impart resistance to said rotation of the spool member and during said relative rotation in the opposite sense the spool member rotates relatively freely with respect to the rotor member, said coupling means comprising a first catch rotatable with one of the spool and rotor members, a circumferential array of teeth rotatable co-axially with the other of said spool and rotor members and biasing means which biases the first catch in a sense to engage said teeth and wherein the adjustable component optionally adjusts the first catch, so that in the first position of the adjustable component during relative rotation between the spool member and carrier in said one sense the first catch is displaced by said teeth and against its biasing means out of engagement with the teeth for the spool member to rotate freely relative to the rotor member and during said relative rotation in the opposite sense the catch is displaced by its biasing means to engage said teeth for the spool member to drivingly engage the rotor member for resistance to be imparted to said rotation of the spool member, and in the second position of the adjustable component during said relative rotation in said one sense the first catch is displaced by its biasing means to engage said teeth for the spool member to drivingly engage the rotor member for resistance to be imparted to said rotation of the spool member and during said relative rotation in said opposite sense the first catch is displaced by said teeth and against its biasing means out of engagement with the teeth for the spool member to rotate freely relative to the rotor member, and a second catch circumferentially spaced from said first catch concentrically with respect to said circular array of teeth, each such catch having associated therewith biasing means which biases it into engagement with said teeth and wherein the adjustable component is common to said catches and comprises means for simultaneously effecting their respective adjustment to said first or second position.

2. An assembly as claimed in claim 1 in which when the spool member is in driving engagement with the rotor member said members rotate in unison.

3. An assembly as claimed in claim 1 in which the adjustable component is mounted for rotation with the one of the spool and rotor members with which the catches are rotatable.

4. Assembly as claimed in claim 1 in which the catches and the adjustable component are carried by said one of the spool and rotor members and the biasing means for the catches comprises spring means which provide biasing of the catches, said spring means being displaceable with said adjustable component for adjustment of the catches to said first or second positions.

5. An assembly as claimed in claim 1 wherein the adjustable component is substantially annular and concentrically mounted on said one of the spool and rotor members which carries the catches, said annular adjustment component being adjusted to said first and second positions by rotational displacement thereof relative to the member which carries it.

6. An assembly as claimed in claim 1 in which the catches comprise a latch lever pivotally mounted to the one of the spool and rotor members with which it is rotatable, said latch lever being pivotally displaceable by the adjustment component optionally to the first position in which one end part thereof is capable of driving engagement with said teeth and to the second position in which an opposite end part thereof is capable of driving engagement with said teeth.

7. An assembly as claimed in claim 1 wherein said adjustable component is annular and concentric with the circumferentially spaced catches and the biasing means comprises spring members which slidingly abut one with each said catch to bias the respective catches into engagement with the teeth and to adjust said catches to said first position or said second position during relative rotation between the adjustable component and the spool member or rotor member which carries it.

8. An assembly as claimed in claim 7 in which the spring members comprise leaf springs each having one end secured to the adjustable component and a free end abutting the respective catch with which that spring is associated.

9. An assembly as claimed in claim 1 in which the array of teeth extend radially outwardly and said catches are disposed radially outwardly of said teeth and are biased radially inwardly for engagement with the teeth 10. An assembly as claimed in claim 1 in which the catches, the adjustable component and the biasing means are carried for rotation with the spool member and the array of teeth are carried for rotation with the rotor member.

11. An assembly as claimed in claim 10 in which the rotor member comprises a toothed wheel of the drag means.

12. An assembly as claimed in claim 1 in which means is provided for restricting adjustment of the adjustable component to either of said first and said second positions.

13. An assembly as claimed in claim 1 in which the spool carrier comprises a cage within which the spool member is received, said cage having a back plate from which extends a spindle on which the spool member is rotatable, and wherein said drag means, said coupling means and said means for optionally adjusting the coupling means are positioned between said back plate and a face of the spool member which opposes the back plate.

14. An assembly as claimed in claim 13 in which the spool member is removable from said cage and said means for optionally adjusting the coupling means is accessible for adjustment with the spool member so removed.

15. An assembly as claimed in claim 1 including means for adjusting the drag means to vary the resistance which is applied thereby to the rotation of the spool member.

* * * * *